United States Patent [19]
Blum

[11] Patent Number: 5,151,788
[45] Date of Patent: Sep. 29, 1992

[54] METHOD AND APPARATUS FOR IDENTIFYING AND ELIMINATING SPECIFIC MATERIAL FROM VIDEO SIGNALS

[76] Inventor: Dieter W. Blum, 104-969 Jervis Street, Vancouver, B.C. V6E 2B7, Canada

[21] Appl. No.: 301,769

[22] Filed: Jan. 26, 1989

[30] Foreign Application Priority Data

Jan. 26, 1988 [CA] Canada .................................... 557321

[51] Int. Cl.⁵ .............................................. H04N 5/44
[52] U.S. Cl. ..................................... 358/188; 358/908
[58] Field of Search ............... 358/142, 146, 188, 908, 358/139, 310, 311, 335

[56] References Cited

U.S. PATENT DOCUMENTS

| | | | |
|---|---|---|---|
| 3,730,986 | 5/1975 | Morehand ........................... | 358/146 |
| 3,745,240 | 7/1973 | Morehand et al. ................. | 358/146 |
| 4,259,689 | 3/1981 | Bonner et al. ...................... | 358/188 |

FOREIGN PATENT DOCUMENTS 0158293 10/1985 European Pat. Off. ............ 358/908
0161512 11/1985 European Pat. Off. ............ 358/142
8100945 4/1981 PCT Int'l Appl. ................. 358/188

Primary Examiner—James J. Groody
Assistant Examiner—David E. Harvey

[57] ABSTRACT

In a content control system for identifying and eliminating commercials from a recording or presentation of a video signal there is shown a content control unit, a VCR and a TV.

The content control unit has an identification and a communication section. The identification section includes a blank frame detector, an activity detector and a timer for detecting the commercials. The communication section communicates by infra-red signals to control the functioning of the VCR and TV. The blank frame detector has a black level extractor being compensated for by a peak level extractor, and a frame luminance level extractor. A blank frame comparator compares the levels of the compensated black level and the frame luminance level. The activity detector determines the rate of change of frame luminance after the blank frame has been detected and the timer is set. The activity timer has an integrator and a differentiator.

74 Claims, 5 Drawing Sheets

METHOD AND APPARATUS FOR IDENTIFYING AND ELIMINATING SPECIFIC MATERIAL FROM VIDEO SIGNALS

FIELD OF THE INVENTION

This invention relates generally to methods and apparatus for the identification of video signals, and more particularly, to methods and apparatus for detection and identification of portions of video signals having specific material thereon. This invention also relates to methods and apparatus for the elimination of portions of video signals having specific material thereon and/or the accompanying audio signal.

BACKGROUND OF THE INVENTION

Systems for the identification of portions of a video signal having specific material thereon, particularly commercial advertisements, are known. The majority of these systems are for use in monitoring and confirming the broadcasting of commercial advertisements and as such may be termed logging systems.

These logging systems fall into two categories, those systems that detect identifying signals present in a video signal and those that monitor and analyze the material content of the video signal utilizing pattern recognition and correlation techniques to identify the material.

Known logging systems detect identification signals encoded on the video signal requiring the co-operation of the broadcasters to encode the material with the identification signals prior to broadcast.

Other known logging systems monitor and analyze the content of the material itself. An example of a system that utilizes the material content of a broadcast signal to identify the material is described in U.S. Pat. No. 3,919,479 to Moon et al. The Moon et al. system employs a non-linear analog transform to generate a low frequency envelope waveform. The information in the low frequency envelope during a predetermined time interval is digitized to generate a signature. The generated signatures are compared with reference signatures to identify the material. The Moon et al. system generates these signatures continuously and consequently requires a large computer to process the generated data.

Various improvements in systems that monitor and analyze material content have become known, and these are primarily concerned with reducing the amount of data to be processed. Such a system is disclosed in U.S. Pat. No. 4,230,990 to Lert, Jr. et al. The system disclosed in the Lert, Jr. et al. patent reduces the amount of data that must be procesed, as compared to the amount of data to be processed by the Moon et al. patent. Cues are either externally generated or the material initiates the signature generation and correlation process.

A further improvement in the art of such logging systems can be found in U.S. Pat. No. 4,677,466 to Lert, Jr. et al. In this patent improvements are made regarding stability influences on the correlation accuracy.

It will be seen however, that all of these logging systems, although monitoring and analyzing program content, require fairly complex processing apparatus and obtain correlation through the matching of reference signatures to the extracted signatures.

To utilize or adapt systems of the logging type to other uses, specifically to eliminate commercial advertisements with a minimum of disruption to the desired program material is neither known in the art nor is it practical in nature.

The other known systems for the identification of portions of a video signal having specific material thereon more particularly concern the elimination of commercial advertisements when recording desired program material from a video signal.

Two systems are known in the art for the elimination of commercial advertisements. The first of these is described in PCT application No. WO 81-00945 to Johnston and Koombes.

The Johnston and Koombes patent discloses a system that detects fade breaks in the video and audio components of a television signal. Such detected fade breaks are assumed to be the beginning of a single commercial in a consecutive block of commercials. These detected fade breaks are used to generate a signal which can trigger or retrigger a timing circuit. The timing circuit generates a control signal of a length slightly greater than the anticipated length of a standard commercial. This control signal may then be applied to the pause control of a video tape recorder. The intention of the method and apparatus disclosed in the Johnston and Koombes patent is therefore the momentary halting of a video tape recorder during the occurrence of a commercial interruption in a desired video signal.

There are a number of shortcomings in said Johnston and Koombes patent. The first is the inability of the apparatus disclosed to properly detect true blank video frames or fields, almost always inserted between program to commercial changes. Only a simple threshold processing method is disclosed, which is unable to accurately process the wide range of levels, content and quality of video signals encountered in a practical use and embodiment. As a result false detection of fade breaks occurs and some fade breaks are undetected.

The second shortcoming of the Johnston and Koombes patent is the inherent inability to detect the resumption of the desired program after the conclusion of any commercial breaks as the return to a program from a commercial interruption is usually accompanied by a fade break. The fade break will trigger the timing circuit and the recording video tape recorder will be maintained in the pause mode for the length of the control signal. Program material of a length slightly greater than a standard commercial will go unrecorded. It is evident that there is a significant loss of desired program material after the end of a commercial break or series of breaks even when all signal conditions favour an acceptable operational accuracy of the fade brake detecting threshold apparatus.

The second system for the elimination of commercial advertisements is described in PCT application No. WO 8300971 to Koombes.

The apparatus and method disclosed therein differs from that in the Johnston and Koombes patent only in the replacement of the timer originated control signal for operating the pause control of a video tape recorder by a reciprocating editing control. The reciprocating editing control memorizes where a fade break has been detected, if it has been detected, on the tape recording of the video signal. The system controls the video tape recorder over a suitable interface to exit the record mode, reverse the tape to the memorized point of the fade break and to enter the record mode again.

The reciprocating method used in the Koombes patent allows for a smaller loss upon the return to the desired program than the timed pause method disclosed in the Johnston and Koombes patent.

However, the shortcomings of the simple threshold detection process are also common to the Koombes patent, as are the problems of interfacing a practical embodiment thereof to the great number of diverse types of video tape recorders in use.

Additionally the cumulative effects of the reciprocating process can lead to the eventual failure of the drive motors of the video cassette recorder. The reciprocating process can also be quite irritating to a viewer who is simultaneously viewing the material in real-time.

Further, neither the timed pause system disclosed in the Johnston and Koombes patent, nor the reciprocating recording system disclosed in the Koombes patent, are suitable to real-time applications such as viewing the video signal on a television at the time of broadcast and blanking audio and/or video portions of the broadcast signal upon the identification of commercial interruptions.

SUMMARY OF THE INVENTION

In a first aspect the present invention provides a method for detecting a blank frame in a video signal, the method comprising: extracting the black level from the video signal to produce a black level signal; gating undesired portions from the video signal to produce a gated signal; continuously extracting the luminance level from the gated signal to produce an average luminance level signal representative of the average luminance level of a frame; and comparing the black level signal and the average luminance signal to determine when the average luminance level signal is within a given threshold of the black level signal.

In a second aspect the present invention provides a method for detecting a blank frame in a video signal comprising: extracting the black level from the signal to produce an extracted black level signal; extracting the peak luminance level of the signal to produce an extracted peak luminance level signal; compensating the extracted black level signal with the extracted peak luminance signal level to produce a compensated black level signal; extracting the average luminance level for each frame of the video signal to produce an extracted average luminance level signal; and comparing the extracted average luminance level signal to the compensated black level signal to determine whether the extracted average luminance level signal is within a threshold of the compensated black level signal.

In a third aspect the present invention provides a method for detecting a commercial advertisement on a video signal, the method comprising; detecting a blank frame on the video signal, setting a timer for a given period after the detection of a blank frame, and testing for activity on the video signal during that period representative of a commercial advertisement.

In a fourth aspect the present invention provides a method for producing a content control signal having set and clear states representing a commercial and no commercial present in a video signal respectively, the method comprising: detecting a blank frame on the video signal; after the detection of a blank frame setting an activity timer for a given period and the content control signal; testing for activity on the video signal during the period representative of a commercial advertisement; and clearing the content control signal when such activity is not detected during the period.

In a fifth aspect the present invention provides a blank frame detector for operation on a video signal, the detector comprising: a primary black level extractor for extracting the black level of the video signal; line gating means gating undesired portions of the video signal; a frame average luminance level extractor being connected to the line gating means and for extracting the average luminance of a frame of the video signal; a blank frame comparator being connected to the black level extractor and the frame average luminance level extractor for determining when the extracted average luminance level of the field is within a given threshold of the extracted black level of the frame.

In a sixth aspect the present invention provides a blank frame detector for operation on a video signal, the detector comprising: a primary black level extractor for extracting the black level of the video signal; a primary peak luminance extractor for extracting the peak luminance level of the field in the frame; black level offset means connected to the primary black level extractor and to the primary peak luminance level extractor for compensating the extracted black level with a desired portion of the extracted peak luminance level; a frame average luminance level extractor for extracting the average luminance level of the frame; and a blank frame comparator connected to the black level offset means and the frame average luminance level extractor for determining whether the extracted average luminance level is within a threshold of the compensated black level.

In an seventh aspect the present invention provides an identification unit for detecting a commercial advertisement on a video signal, the unit comprising: a blank frame detector for detecting blank frames on the video signal; an activity timer being connected to the blank frame detector and being set upon the detection of a blank frame in the signal; and an activity detector being connected to the blank frame detector and the activity timer for testing for activity representative of a commercial advertisement in the signal during the time the activity timer is set.

In a eighth aspect the present invention provides a content control unit for controlling a storage device recording a video signal to limit the recording of commercial material contained thereon, the unit comprising: an identification section comprising: a blank frame detector for detecting blank frames in the video signal; an activity timer being connected to the blank frame detector and being set upon the detection of a blank frame in the video signal; and an activity detector being connected to the blank frame detector and the activity timer for testing for activity representative of a commercial advertisement in the video signal during the time the activity timer is set; and a communication section being connected to the content control unit and adapted to be coupled to the storage device for communicating instructions based upon the detection of blank frames and the detection of such activity by the identification section.

In a ninth aspect the present invention provides a content control system operating on a video signal containing commercial material, the system comprising: a storage device for recording the video signal; a content control unit being connected to the storage device and comprising: an identification section comprising: a blank frame detector for detecting blank frames in the video signal; an activity timer being connected to the blank frame detector and being set upon the detection of a blank frame in the video signal; and an activity detector being connected to the blank frame detector and the activity timer for testing for activity representative of a commercial advertisement in the video signal during the time the activity timer is set; and a communication section being connected to the content control unit and coupled to the storage device for communicating instructions based upon the detection of blank frames and the detection of such activity by the identification section.

It is an object of the present invention to provide methods and apparatus for identifying and for eliminating specific material, namely commercial advertisements, from video signals that in their various embodiments overcome many of the disadvantages of systems presently known in the art.

It is another object of the present invention in at least one of its embodiments to provide for identification of commercial advertisements and their subsequent elimination with decreased undesirable disruption to the broadcasting program material.

It is another object of the present invention in at least one of its embodiments to provide for such identification for real-time applications.

It is still another object of the present invention in at least one of its embodiments to provide means to interface at least one embodiment of the present invention to most video tape recorders and television receivers.

BRIEF DESCRIPTION OF THE DRAWINGS

For a better understanding of the present invention, and to show more clearly how it may be carried into effect, reference will now be made, by way of example to the accompanying drawings, which show preferred embodiments of the present invention, and in which.

DETAILED DESCRIPTION OF THE PREFERRED EMBODIMENT OF THE PRESENT INVENTION

Figure 1:
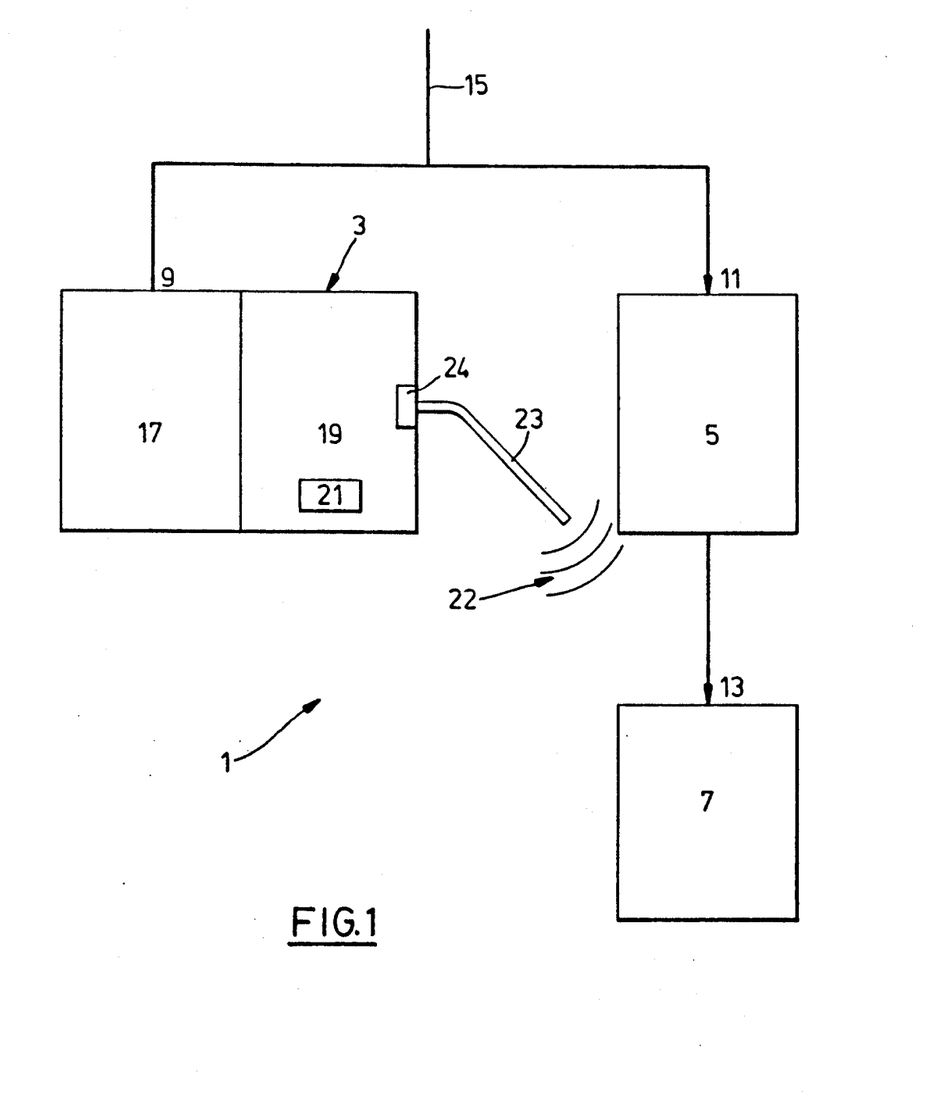
FIG. 1 is a block diagram of a content control system according to the preferred embodiment of the present invention.

Reference will now be made to FIG. 1. A content control system has a content control unit 3, a storage device 5 and a viewing apparatus 7. The storage device 5 utilized in the preferred embodiment is a video cassette recorder (VCR) 5 and will be described as such. Similarly, the viewing apparatus 7 in the preferred embodiment is a television (TV) 7. It is to be understood that other embodiments employing alternate storage devices 5 such as reel-to-reel video tape recorders or suitably interfaced audio recorders and alternate viewing apparatuses such as monitors would fall within the spirit and scope of the invention.

Each of the control unit 3, VCR 5 and TV 7 has an input 9, 11, 13 respectively for a video signal. In the control system of FIG. 1 the inputs 9, 11 take their video signal from a composite video signal 15. Such a signal 15 may be derived from a cable network system or be picked up from an antenna, not shown. The video input 13 takes its composite video signal routed through the VCR 5 as is known in the art.

The content control unit 3 is divided into two sections; content identification 17 and communication 19. The content identification section 17 takes its input from the signal 15 and the sections 17, 19 are connected as will be later described.

The communication section 19 also has switches 21 through which the user may determine the configuration he wishes the system 1 to take.

The communication section 19 outputs communication signals 22 via a fibre optic cable 23 to the VCR 5 and the TV 7. The communication signals 22 in the preferred embodiment originate from an infra-red transmitter 24 and are infra-red in nature, but are not so restricted. Embodiments providing electrical cable communication and the like, not shown, are possible, but virtually all VCR's 5 and TV's 7 presently manufactured provide for infra-red control while only some provide for such cable control.

The system 1 as shown in FIG. 1 operates as follows. The VCR 5 is set to record material from the composite video signal 15. The control unit 3 via the identification section 17 detects a commercial and informs the communication section 19. The communication section 19 informs the VCR 5 via the communication signals 23 whereupon the VCR stops recording the signal 15.

The identification section 17 then determines when the commercial has ended and informs the communication section 19. The VCR 5 is thereupon informed and the recording recommences.

The viewer may watch his/her TV 7 while the VCR 5 is recording as the signal 15 is routed through the VCR 5 to the input 13. The communication signals 22 can additionally cause the TV 7 to stop presenting material from the signal 15 or a portion thereof.

Alternatively the communication signals 22 may stop the presentation during viewing on the TV 7 when the VCR 5 is not set to record at all.

To understand the operation of the identification circuit 17 utilized in the preferred embodiment one should first understand the nature of a composite video signal 15.

Reference will now be made to FIG. 2 where there is shown a typical National Television Standards Committee (NTSC) composite video signal 15 for a portion of a TV picture or frame. A frame is comprised of 525 lines. The lines do not follow consecutively to make up a frame, but rather one field composed of consecutive even numbered lines is followed by a second field composed of consecutive odd numbered lines. This interlacing helps to smooth changes from one frame to the next.

A TV viewing screen, not shown, does not display all 525 lines of a frame. The first 21 lines of each frame are used for material which will not normally be displayed with the other lines.

Figure 2A:
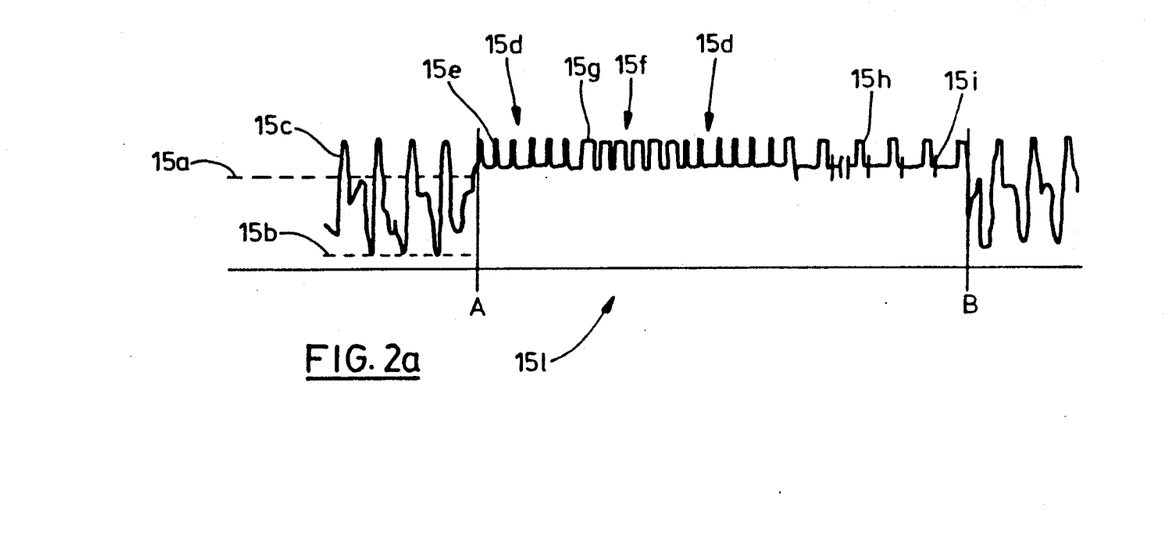
FIG. 2a is a diagram of one field of a composite video signal.

The format of a first field of a frame of an NTSC composite video signal 15 is shown in FIG. 2a.

The NTSC signal 15 varies about two levels; the reference black level 15a and the reference white level 15b. When the NTSC signal 15 is at or above the black level 15a that portion of the frame is displayed as black.

When a frame is completely black the frame will appear to be blank so this range is called the blanking level 15c. As the NTSC signal 15 approaches the white level 15b the luminance or brightness of the frame increases.

The beginning of transmission for one frame commences at A.

Figure 2B:
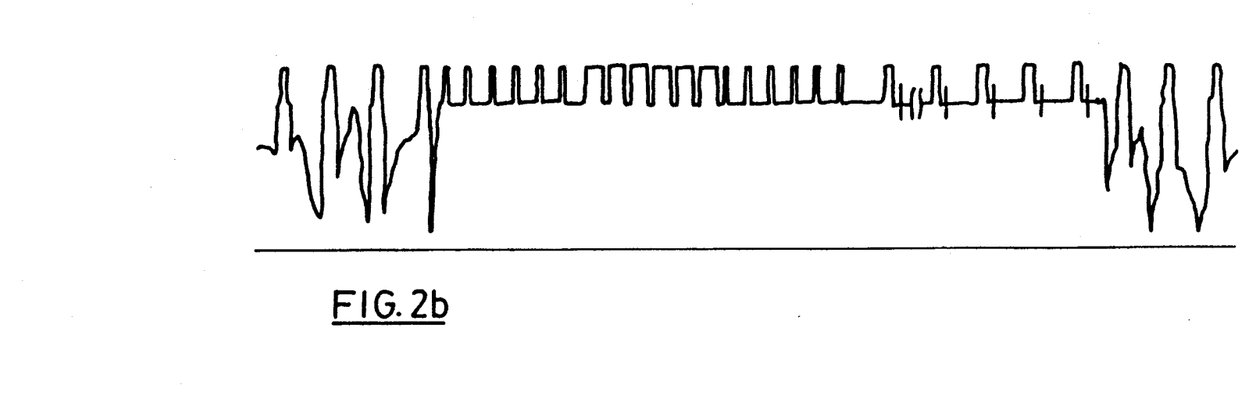
FIG. 2b is a diagram of the other field of a composite video signal.

A first equalization interval 15d is composed of a series of equation pulses 15e. An example of an equation pulse 15e is better shown in FIG. 2d. Following the equalization interval 15d is a vertical sync interval 15f comprising a series of vertical sync pulses 15g, an example of which is shown in FIG. 2d.

A second equalization interval 15d follows the vertical sync interval 15f.

After the intervals 15d, 15f the NTSC signal 15 puts out a series of horizontal sync pulses 15h and reference colour bursts 15i. The field moves forward one line for each horizontal sync pulse 15h. An example of a horizontal sync pulse 15h and colour burst 15i is best shown in FIG. 2e. Prior to the horizontal sync pulse 15h is a front porch 15j and following the horizontal sync pulse is a back porch 15k. The colour burst 15i is encoded on the back porch 15k.

At B of FIG. 2a the NTSC signal 15 has reached the video material used for display at the top of a picture. This is the 22nd line of each field.

The portion of the NTSC signal 15 between A and B is called the vertical blanking interval 15l. This may contain irrelevant video information.

Figure 2C:
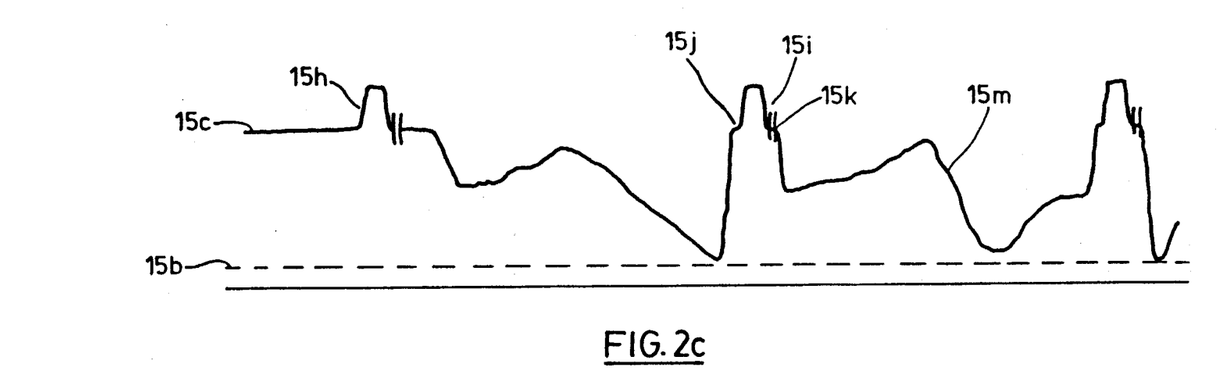
FIG. 2c is a diagram of the detail of FIG. 2b between lines 3—3.
Figure 2D:
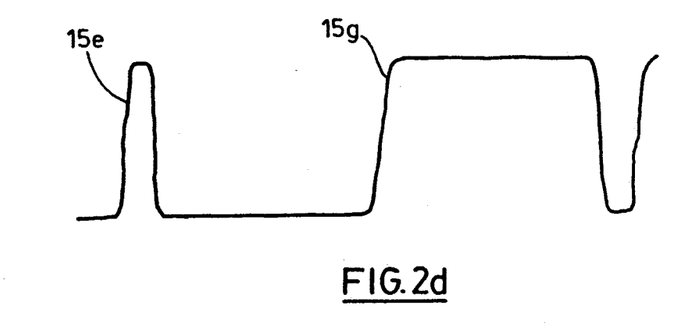
FIG. 2d is a diagram of detail of FIG. 2b between lines 4—4.
Figure 2E:
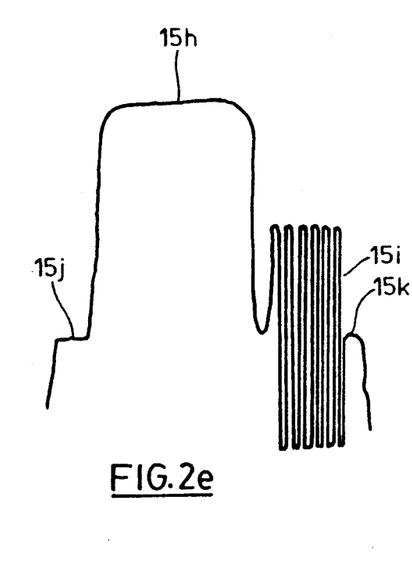
FIG. 2e is a diagram of detail of FIG. 2c between lines 5—5.

As best shown in FIG. 2c luminance and colour information for each line of a frame is contained in the portion 15m of the NTSC signal 15 between the back porch 15k and the next front porch 15j. The luminance or brightness information is given by the voltage level of the NTSC signal 15 and ranges from black to white. The colour information is encoded on the luminance information.

A blank field exists when all lines are at or near the blanking level 15c.

The format of the other field is similar to that of the field shown in FIG. 2a except for an offset in the lines and is shown in FIG. 2b. A blank frame exists when both the fields of FIGS. 2a and 2b are at the blanking level 15c.

Other composite video signal formats are known, including PAL and SECAM. The principles of the present invention will be equally applicable to these formats, but necessary modifications must be made to take into account the difference in the number of scanned lines and other such differences.

Figure 3:
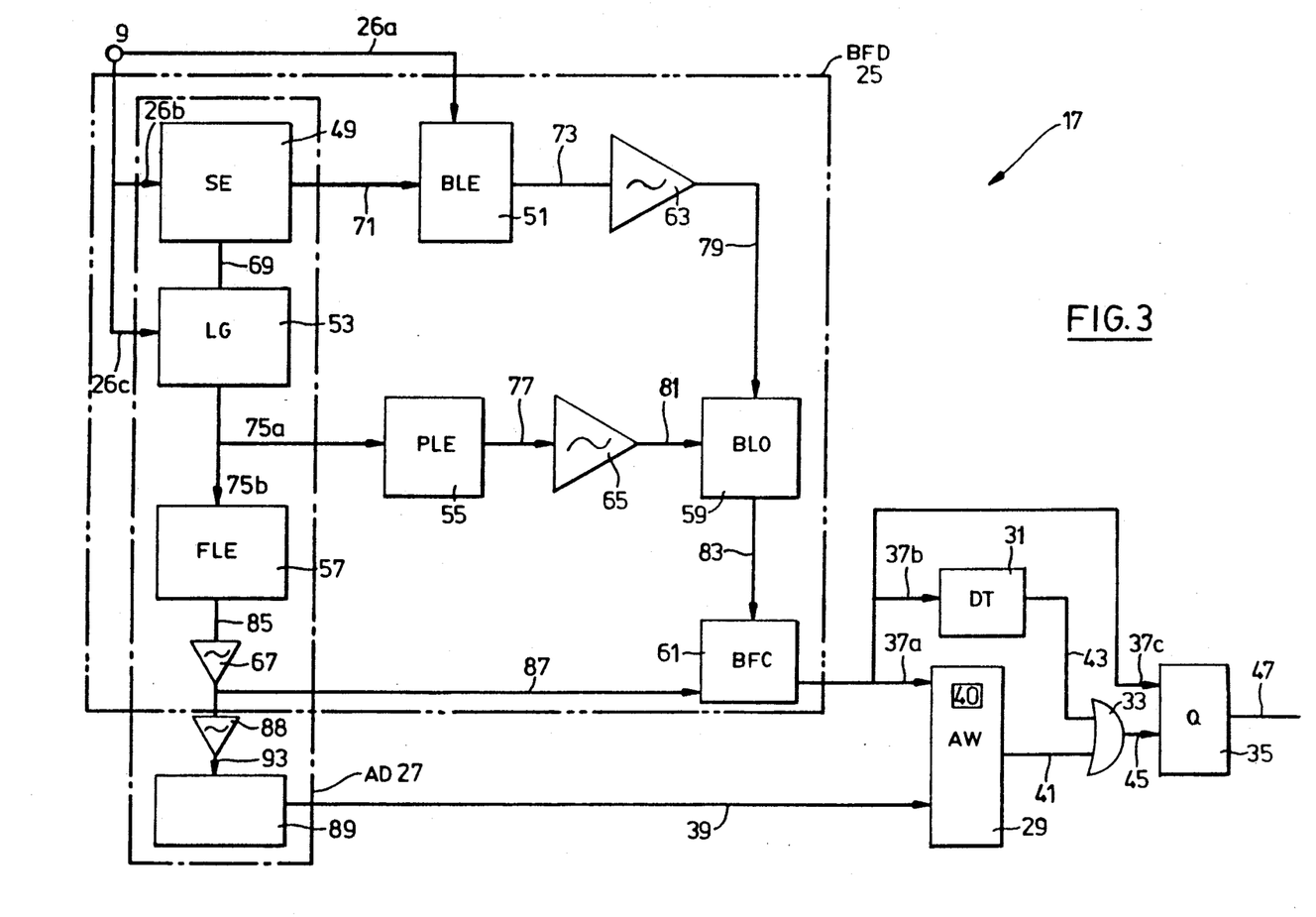
FIG. 3 is a block diagram of an identification section employed in the content control system of FIG. 1.

Reference will now be made to FIG. 3 where there is shown a content identification section 17.

The content identification section 17 as shown has six components; a blank frame detector 25 outlined in double chain lines, an activity detector 27 shown in single chain lines, an activity window circuit 29, a delay timer 31, an OR gate 33 and a Q flip-flop 35.

The blank frame detector 25 is connected to the input 9 of FIG. 1 via lines 26a, 26b and 26c. The blank frame detector 25 is also connected to the activity window 29, the delay timer 31 and the set input of the Q flip-flop 35 via the lines 37a, 37b and 37c, respectively.

The activity detector 27 is also connected to the input 9 via lines 26b and 26c and to the activity window 29 via line 39. The activity window 29 has an activity timer 40.

The activity window 29 and the delay timer 31 are connected to the inputs of the OR gate 33 via lines 41 and 43 respectively. The output of the OR gate 33 is connected to the clear input of the Q flip-flop 35 via line 45. The output of the Q flip-flop 35 is a content control line 47.

The identification section 17 operates on the following principles. Commercials broadcast on a signal 15 typically begin and end with a blank frame to allow for switching between program and commercial or commercial and commercial material. The blank frames are necessary to avoid overlapping of material during the switching process.

The identification section 17 will begin operation with the Q flip-flop 35 in the cleared state and the content control line 47 in a logic low position representing no commercial present. Until the blank frame detector 25 detects a blank frame in the signal 15 of FIG. 1 the content control line 47 will not change state.

When a blank frame is detected the Q flip-flop 35 is set via line 37c changing the state of the content control line 47 to a logic high position representing a commercial present. The delay timer 31 and the activity timer 40 in the window circuit 29 are also set via lines 37b and 37a.

When the activity timer 40 is set the activity window circuit 29 tests the signal on line 39 from the activity detector 27. If the signal on line 39 is high then the signal to the OR gate via line 41 is low and vice versa.

As well as beginning with a blank frame, the inventor has discovered commercials very soon thereafter follow with a great deal of activity. The advertiser has a short period of time to get the message across and the activity catches the attention of the viewer. On the other hand the level of activity at the beginning of program material is much lower a substantial amount of time.

The activity in a commercial on the signal 15 of FIG. 1 is detected by the activity detector 27 over lines 26b and 26c. The detection or lack thereof is communicated to the activity window 29 over line 39.

During the period after a blank frame is detected for which the activity window timer 40 is set the signal on line 41 will be a logic high if activity has not been detected and a logic low if activity has been detected. As we have assumed a commercial is present the line 41 will be low and the content control line 47 will be unaffected.

When the commercial is coming to an end a blank frame will again be detected by the blank frame detector 25. As the Q flip-flop 35 is already set the detection of the blank frame does not effect the state of the content control line 47. However the activity window timer 40 will be set, and assuming program material is now on the signal 15, little activity will be detected during the timed period. The signal on line 41 will be high and transmitted through the OR gate 33 to the clear input of the Q flip-flop 35. The content control line 47 will be cleared to a logic low representing no commercial present.

The clearing of the content control line 47 at the end of a commercial will be delayed by the amount of time the activity detector 27 takes to detect the lack of activity.

The inventor has determined the optimum length of time for the activity window timer 40 is approximately 8 seconds. If less than 8 seconds are used the activity of a commercial is more likely to be erroneously detected as being the activity of a program. If greater than 8 seconds are used the opposite is more likely to be true. In tests with the 8 second timing only 20 seconds of commercial was allowed for a three hour broadcast. Even these 20 seconds may have due to the use of a jog timer which will be further mentioned later.

The delay timer 31 is a fail-safe mechanism in case the activity detector 27 should fail to correctly determine the resumption of program material. The delay timer 31 is set on the detection of a blank frame as previously described. The delay timer 31 is set for a period of time slightly longer than the length of a standard commercial. Standard commercials are typically 30 seconds long, but some are one minute or longer. The delay timer 31 was set for slightly longer than 30 seconds in the preferred embodiment.

If activity is not detected during the period of time given by the activity window timer 40 the delay timer 31 will cause the change of state of the content control line 47 to no commercial present after timing out without another blank frame being detected. In such a situation it is assumed that a commercial was incorrectly detected as the ending blank frame of the commercial did not follow within the requisite time of the beginning blank frame.

If more than one blank frame begins or ends a commercial the delay timer 31 and the activity window timer 40 are continuously set so the period for detection of activity is not adversely affected.

If one commercial follows another the process will be similar to that described above for the initial commercial except two blank frames in a row should occur. This will not affect the process of identification for the reason described above.

As shown by the dashed lines on FIG. 3 the blank frame detector 25 is itself made up of ten circuits; a sync extract circuit 49, a black level extract circuit 51, a line gating circuit 53, a peak luminance extract circuit 55, a field luminance extract circuit 57, a blank level offset circuit 59, a blank frame comparator 61 and three low pass filters 63, 65 and 67.

The sync extract circuit 49 is connected by line 26b to the input 9. The sync extract circuit 49 extracts the horizontal sync pulses 15h of FIG. 2 from the signal 15 of FIGS. 1 and 2 to determine the beginning of each line and outputs the pulses 15h on line 69 to the line gating circuit 53. The sync extract circuit 49 also determines the end of the sync pulse 15h and the beginning of the back porch 15k of FIG. 2. The back porch signal 15k is output on line 71 to the black level extract circuit 51.

The black level extract circuit 51 is also connected to the input 9 via line 26a. The black level extract circuit 51 measures the voltage level of the broadcast signal 15 of FIGS. 1 and 2 on line 26a at the time given by the back porch 15k from FIG. 2 on line 71. The signal on line 73 will be a series of black level pulses.

The low pass filter 63 takes the extracted black level for each line of the broadcast signal 15 of FIG. 1 via line 73 and smooths the area between the black level pulses. The time constant of the low pass filter is fairly long at approximately the duration of one field. The signal on line 79 will at any one time be representative of the black level on the back porch 15k.

The line gating circuit 53 is also connected to the input 9 via line 26c. The line gating circuit 53 gates out the first 21 lines of each field. The beginning of each line is given by the sync pulses 15h of FIG. 2 on line 69. The line gating is necessary as the first 21 lines may contain irrelevant video information as discussed previously. If this information were to be included frames which are otherwise blank frames may go undetected.

The line gated signal is then sent to the peak luminance extract circuit 55 and the field luminance extract circuit 57 via lines 75a and 75b.

The peak luminance extract circuit 55 contains a rectifying diode, not shown, and extracts the peak level of luminance, i.e. that nearest the white level 15b of FIG. 2, for each line. The peak luminance level is transmitted to the low pass filter 65 over line 77. The low pass filter 65 smooths the extracted peak luminance levels over a field operating in a manner similar to low pass filter 63.

The smoothed peak luminance level is representative of the peak luminance level of the broadcast signal 15 over the last field.

The low pass filters 63, 65 transmit the smoothed levels to the black level offset circuit 59 over lines 79 and 81.

The black level offset circuit 59 adds a percentage of the smooth peak luminance level from line 81 to the smoothed black level on line 79 and outputs the result as a compensated black level on line 83 to the blank frame comparator 61.

Meanwhile the field luminance extract circuit 57 continuously extracts the luminance of the signal 15 of FIG. 1. The extracted luminance signal is sent to the low pass filter 67 over line 85. The low pass filter 67 smooths the extracted luminance signal from line 85 over one frame in a manner similar to the other low pass filters 63, 65, but having double the time constant. The smoothed luminance signal is indicative of the average luminance of the last frame.

The smoothed luminance signal is then transmitted over line 87 to the blank frame comparator 61. The blank frame comparator 61 determines whether the signals on lines 83 and 87, the compensated black level and the smoothed frame luminance, are within a given threshold of each other. If the signals are within the threshold then there has been a blank frame and the blank frame comparator 61 connection to the activity window circuit 29 on line 37a and the activity window timer 40 is set as discussed previously. Due to the relatively long time constants of the filters 63, 65, 67 a full frame must be blank to bring down the smoothed frame luminance signal on line 87 to within the threshold of the compensated black level on line 83. In the preferred embodiment the average frame luminance on line 87 had to be within 5% of the compensated black level on line 83.

The extracted black level on line 79 is compensated by the black level offset circuit 59 with the extracted peak luminance on line 81 to effectively vary the threshold of the blank frame comparator 61 during operation. A field with a low average peak luminance per line will have approximately the set threshold, while a field with a high average peak luminance per line will have a higher effective threshold.

The varying threshold is desirable as the black level can vary from one signal 15 to another, especially between stations. In the preferred embodiment the black level was compensated with approximately 5% of the peak luminance level by the offset circuit 59.

As shown by the chain lines in FIG. 3 the activity detector 27 is itself made up of four circuits 49, 53, 57 and 67 shared with blank frame detector 25 and an integrator 88 and a differentiator 89. The shared circuits are the sync extract 49, line gating 53, the field luminance extract 57 and the low pass filter 67 which operate as previously described.

The low pass filter 67 is connected to the integrator 88 via line 91 to transmit the smoothed frame luminance. The integrator 88 integrates the smoothed frame luminance over a period longer than that of the low pass filter 67, approximately 0.1 seconds.

The integrated frame luminance is then transmitted to the differentiator 89 on line 93. The differentiator 89 differentiates the integrated luminance over a period longer than several periods of the integrator 88.

The combination of the integrator 88 and the differentiator 89 detects the rate of change from the approximate average luminance of a number or set of frames to the approximate average luminance of a previous set of frames. The magnitude of the rate of change of luminance from one set of frames to the next is indicative of the activity occurring in the material on the signal 15. In the preferred embodiment the activity detector 27 was capable of detecting changes in frame luminance of approximately 5% over 0.1 seconds.

The output of the differentiator 89 is an activity signal on line 39 from the activity detector 27 to the activity window 29 and operates the activity window 29 as described previously.

Figure 4:
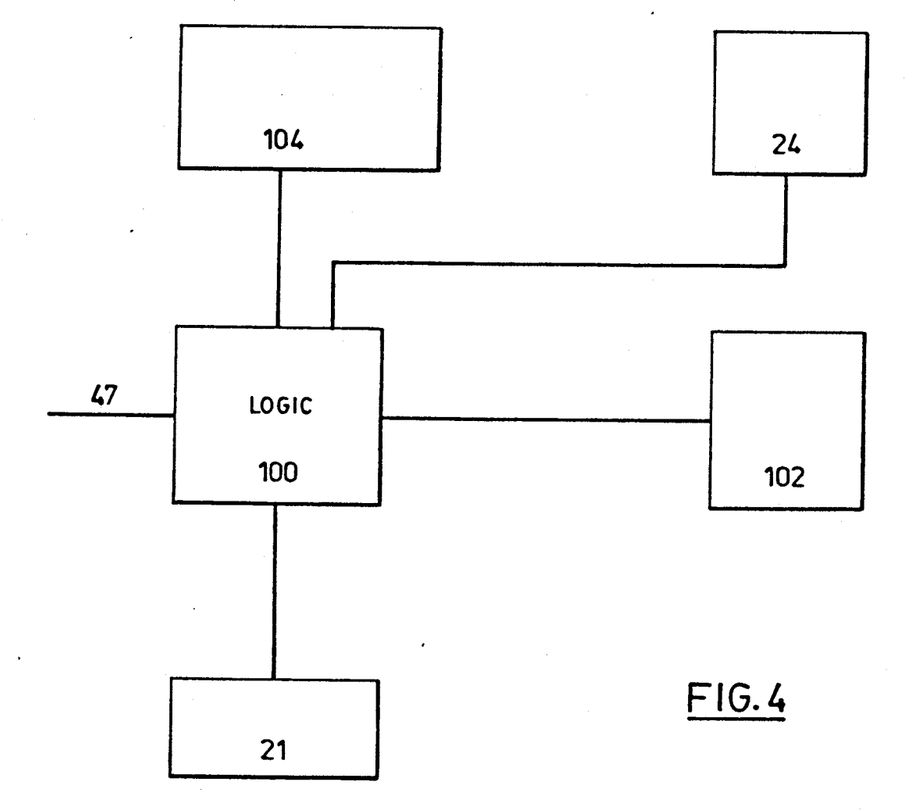
FIG. 4 is a block diagram of a communication section of the content control system of FIG. 1.

Reference will now be made to FIG. 4. The content control line 47 of FIG. 3 is connected to the communication section 19 of FIG. 1 as mentioned previously. The content control line 47 is an input to a logic circuit 100.

The logic circuit 100 is connected to the switches 21 of FIG. 1, a memory unit 102, an infra-red receiver 104 and the infra-red transmitter 24.

In operation, the content control system 1 operates as follows.

The communication section 19 must learn the communication signals 23 of FIG. 1 necessary to control the VCR 5. The memory 102 of FIG. 4 in the preferred embodiment is a 4 register shift register 102. To store the communication signals 23 for record, stop, pause and mute, the switches 21 are selected for a learn record function and a learn register of the 4 register shift register 102 is selected via the logic circuit 100. A remote control unit, not shown, for the VCR 5 is placed in front of the receiver 104 and the record instruction for the remote control is pressed. The receiver 104 receives the record instruction from the remote control, not shown, and stores it in the learn register of the shift register 102 via the logic circuit 100.

A similar operation is performed with the stop and pause instructions of the VCR 5 remote control with the instructions being stored in stop and pause registers of the registers 102.

The mute instruction will control the TV 7 and must be input from the remote control from the TV 7 to the last register of the register 102 in a similar manner.

To put the control unit 3 into operation the transmission cable 106 is placed in front of the VCR 5.

A record mode of the control unit 3 is selected by pressing the appropriate switches 21, the content control line is cleared and the communication section 19 transmits the record instruction from the register 102 through the infra-red transmitter 24 and the fibre-optic cable 23 of FIG. 1 to the VCR 5. The VCR 5 places itself in the record mode and records the signal 15 from input 11.

Meanwhile, the identification section 17 picks up the signal 15 from the input 9 and the blank frame detector 25 of FIG. 3 begins detecting blank frames. When a blank frame is detected control line 47 is set and the pause instruction from the register 102 of FIG. 4 is selected by the logic circuit 100 and transmitted by the infra-red transmitter 24 to the VCR 5 of FIG. 1. The VCR 5 places itself in the pause mode and stops recording the signal 15.

The activity detector 27 of FIG. 3 then examines the signal 15 for activity. Assuming a commercial is presently on the signal 15, the activity detector 27 will detect such activity and the control line 47 will not be cleared. The communication unit 19 will have no communication to transmit.

When the next blank frame is detected, before the delay timer 31 times out and assuming the commercial has ended, the control line 47 will not change state so the pause instruction will not be sent again. The activity detector 27 will not detect activity during the time of the activity timer 40. The control line 47 will be cleared and the communication section 19 informed. The logic circuit 100 of FIG. 4 will select the pause instruction from the register 102 and cause the instruction to be transmitted to the VCR 5. On receiving the second pause instruction the VCR 5 will remove itself from the pause mode and will recommence recording.

Similar procedures will be followed where one commercial follows another except activity will be detected and the VCR 5 will remain in the pause mode until the sequence of commercials ends.

Most VCR's 5 have a maximum length of time for which they will remain in the pause mode before automatically recommencing recording or stopping recording altogether. Typically this maximum length of time is 2.5 minutes. To avoid such an action during a long sequence of commercials a jog timer, not shown, may be employed in the identification section 17 to clear the control line 47 if the control line 47 has been set for almost the maximum length of time.

Where the viewer is viewing the TV 7 of FIG. 1 during recording or otherwise an unadultered as discussed previously signal 15 appears at the input 13 through the VCR 5. To mute the audio of the TV 7 during a viewing session the transmission cable 24 should be placed so that the TV 7 may also receive the communication signals 23. The viewer may additionally select a mute mode through the switches 21. This mode may be selected while recording or while viewing without recording. At each occasion when a pause instruction would be sent to the VCR 5 if a recording was being made, the mute instruction will be sent in a similar fashion. This will cause the TV 7 audio to remain off during commercials.

Where it is desired to employ event timing such as most VCR's 5 provide, communication with the VCR 5 is not usually allowed. It may be desirable to include in the communication section 19 another event timer which would provide additional control features.

Alternate embodiments are possible which do not employ a VCR 5, but use only the mute instruction to control a TV 7. It is to be understood that other embodiments of the present invention will be evident to those skilled in the art and will fall within the spirit and scope of the present invention as defined by the following claims. Such embodiments would include those employing activity detection and blank frame detection on non-composite video signals with necessary modifications.

I claim:

1. A method for detecting a blank frame in a video signal, the method comprising:

extracting the black level from the video signal to produce a black level signal;

gating undesired portions from the video signal to produce a gated signal;

continuously extracting the luminance level from the gated signal to produce an average luminance level signal representative of the average luminance level of a frame; and comparing the black level signal and the average luminance signal to determine when the average luminance level signal is within a given threshold of the black level signal.

2. A method according to claim 1, wherein extracting the black level comprises; extracting the black level from each line of the video signal to produce a series of black level pulses and smoothing the black level pulses to produce the black level signal.

3. A method according to claim 2, wherein extracting the luminance level comprises; extracting the luminance level from each line of the gated signal to produce a series of luminance level pulses and smoothing the luminance level pulses to produce the average luminance level signal.

4. A method according to claim 3, wherein extracting the black level produces an uncompensated black level signal and further comprising; extracting the peak luminance level from each line of the gated signal, to produce a series of peak luminance level pulses and smoothing the peak luminance level pulses to produce the peak luminance level signal and compensating the uncompensated black level signal to produce the black level signal.

5. A method according to claim 1, wherein the threshold is approximately 5% of the black level signal.

6. A method according to claim 1 wherein extracting the black level produces an uncompensated black level signal and further comprising; extracting the peak luminance level of the gated signal to produce a peak luminance level signal and compensating the uncompensated black level signal with the peak luminance level signal to produce the black level signal.

7. A method for detecting a blank frame in a video signal comprising:

extracting the black level from the video signal to produce an extracted black level signal;

extracting the peak luminance level of the composite signal to produce an extracted peak luminance level signal;

compensating the extracted black level signal with the extracted peak luminance signal level to produce a compensated black level signal;

extracting the average luminance level for each frame of the video signal to produce an extracted average luminance level signal; and comparing the extended average luminance level signal to the compensated black level signal to determine whether the extracted average luminance level signal is within a threshold of the compensated black level signal.

8. A method for detecting a commercial advertisement on a video signal, the method comprising; detecting a blank frame on the video signal, setting a timer for a given period after the detection of a blank frame, and testing for activity on the video signal during that period representative of a commercial advertisement.

9. A method according to claim 8, the video signal being a video signal, wherein detecting a blank frame comprises:

extracting the black level from the video signal to produce a black level signal;

gating undesired portions from the video signal to produce a gated signal;

continuously extracting the luminance level from the gated signal to produce an average luminance level signal representative of the average luminance level of a frame; and comparing the black level signal and the average luminance signal to determine when the average luminance level signal is within a given threshold of the black signal.

10. A method according to claim 9, wherein extracting the black level comprises; extracting the black level from each line of the video signal to produce a series of black level pulses and smoothing the black level pulses to produce the black level signal.

11. A method according to claim 10, wherein extracting the luminance level comprises; extracting the luminance level from each line of the gated video signal to produce a series of luminance level pulses and smoothing the luminance level pulses to produce the average luminance level signal.

12. A method according to claim 11, wherein extracting the black level produces an uncompensated black level signal and further comprising; extracting the peak luminance level from each line of the gated signal, to produce a series of peak luminance level pulses and smoothing the peak luminance level pulses to produce the peak luminance level signal and compensating the uncompensated black level signal to produce the black level signal.

13. A method according to claim 9, wherein the threshold is approximately 5% of the black level signal.

14. A method according to claim 9, wherein extracting the black level produces an uncompensated black level and further comprising; extracting the peak luminance level of the gated signal to produce a peak luminance level signal and compensating the uncompensated black level signal with the peak luminance level signal to produce the black level signal.

15. A method according to claim 14, wherein testing for activity comprises; continuously integrating the luminance level from the video signal over a number of frames to produce an integrated luminance level signal, differentiating the integrated luminance level signal to determine its rate of change.

16. A method according to claim 8, for detecting a blank frame in a video signal comprising:

extracting the black level from the video signal to produce an extracted black level signal;

extracting the peak luminance level of the composite signal to produce an extracted peak luminance level signal;

compensating the extracted black level signal with the extracted peak luminance signal level to produce a compensated black level signal;

extracting the average luminance level for each frame of the video signal to produce an extracted average luminance level signal; and comparing to determine whether the extracted average luminance level signal is within a threshold of the compensated black level signal.

17. A method according to claim 9, wherein testing for activity comprises; continuously integrating the average luminance level signal from the video signal over a number of frames to produce an integrated luminance level signal; differentiating the integrated luminance level signal to determine its rate of change.

18. A method according to claim 17, wherein extracting the black level comprises; extracting the black level from each line of the video signal to produce a series of black level pulses and smoothing the black level pulses to produce the black level signal; and wherein extracting the luminance level comprises; extracting the luminance level from each line of the gated video signal to produce a series of luminance level pulses and smoothing the luminance level pulses to produce the average luminance level signal.

19. A method according to claim 18, wherein extracting the black level produces an uncompensated black level signal and further comprising; extracting the peak luminance level from each line of the gated signal, to produce a series of peak luminance level pulses and smoothing the peak luminance level pulses to produce the peak luminance level signal and compensating the uncompensated black level signal to produce the black level signal.

20. A method according to claim 19, wherein the given period is approximately 8 seconds.

21. A method according to claim 17, wherein extracting the black level produces an uncompensated black level and further comprising; extracting the peak luminance level of the gated signal to produce a peak luminance level signal and compensating the uncompensated black level signal with the peak luminance level signal to produce the black level signal.

22. A method according to claim 21, wherein the given period is approximately 8 seconds.

23. A method according to claim 8, wherein the given period is approximately 8 seconds.

24. A method according to claim 8, wherein testing for activity comprises; continuously integrating the luminance level from the video signal over a number of frames to produce an integrated luminance level signal; differentiating the integrated luminance level signal to determine its rate of change.

25. A method for producing a content control signal having set and clear states representing a commercial and no commercial present in a video signal respectively, the method comprising:
   detecting a blank frame on the video signal;
   after the detection of a blank frame setting an activity timer for a given period and the content control signal;
   testing for activity on the video signal during the period representative of a commercial advertisement; and
   clearing the content control signal when such activity is not detected during the period.

26. A method according to claim 25, wherein detecting a blank frame comprises:
   extracting the black level from the video signal to produce a black level signal;
   gating undesired portions from the video signal to produce a gated signal;
   continuously extracting the luminance level from the gated signal to produce an average luminance level signal representative of the average luminance level of a frame; and
   comparing the black level signal and the average luminance level signal to determine when the black level signal is within a given threshold of the average luminance signal.

27. A method according to claim 26, wherein extracting the black level comprises; extracting the black level from each line of the video signal to produce a series of black level pulses and smoothing the black level pulses to produce the black level signal.

28. A method according to claim 27, wherein extracting the luminance level comprises; extracting the luminance level from each line of the gated video signal to produce a series of luminance level pulses and smoothing the luminance level pulses to produce the average luminance level signal.

29. A method according to claim 28, wherein extracting the black level produces an uncompensated black level signal and further comprising; extracting the peak luminance level from each line of the gated signal, to produce a series of peak luminance level pulses and smoothing the peak luminance level pulses to produce the peak luminance level signal and compensating the uncompensated black level signal to produce the black level signal.

30. A method according to claim 26, wherein the threshold is approximately 5% of the black level signal.

31. A method according to claim 26, wherein extracting the black level produces an uncompensated black level and further comprising; extracting the peak luminance level of the gated signal to produce a peak luminance level signal and compensating the uncompensated black level signal with the peak luminance level signal to produce the black level signal.

32. A method according to claim 31, wherein testing for activity comprises; continuously integrating the luminance level from the video signal over a number of frames to produce an integrated luminance level signal, differentiating the integrated luminance level signal to determine its rate of change.

33. A method according to claim 25, for detecting a blank frame in a video signal comprising:
   extracting the black level from the video signal to produce an extracted black level signal;
   extracting the peak luminance level of the video signal to produce an extracted peak luminance level signal;
   compensating the extracted black level signal with the extracted peak luminance signal level to produce a compensated black level signal;
   extracting the average luminance level for each frame of the video signal to produce an extracted average luminance level signal; and
   comparing to determine whether the extracted average luminance level signal is within a threshold of the compensated black level signal.

34. A method according to claim 26, wherein testing for activity comprises; continuously integrating the average luminance level signal from the video signal over a number of frames to produce an integrated luminance level signal; differentiating the integrated luminance level signal to determine its rate of change.

35. A method according to claim 34, wherein extracting the black level comprises; extracting the black level from each line of the video signal to produce a series of black level pulses and smoothing the black level pulses to produce the black level signal; and wherein extracting the luminance level comprises; extracting the luminance level from each line of the gated video signal to produce a series of luminance level pulses and smoothing the luminance level pulses to produce the average luminance level signal.

36. A method according to claim 35, wherein extracting the black level produces an uncompensated black level signal and further comprising; extracting the peak luminance level from each line of the gated signal, to produce a series of peak luminance level pulses and smoothing the peak luminance level pulses to produce the peak luminance level signal and compensating the uncompensated black level signal to produce the black level signal.

37. A method according to claim 36, wherein the given period is approximately 8 seconds.

38. A method according to claim 34, wherein extracting the black level produces an uncompensated black level and further comprising; extracting the peak luminance level of the gated signal to produce a peak luminance level signal and compensating the uncompensated black level signal with the peak luminance level signal to produce the black level signal.

39. A method according to claim 38, wherein the given period is approximately 8 seconds.

40. A method according to claim 25, wherein the given period is approximately 8 seconds.

41. A method according to claim 25, wherein testing for activity comprises; continuously integrating the luminance level from the video signal over a number of frames to produce an integrated luminance level signal; differentiating the integrated luminance level signal to determine its rate of change.

42. A blank frame detector for operation on a video signal, the detector comprising:
- a primary black level extractor for extracting the black level of the video signal;
- line gating means gating undesired portions of the video signal;
- a frame average luminance level extractor being connected to the line gating means and for extracting the average luminance of a frame of the video signal;
- a blank frame comparator being connected to the black level extractor and the frame average luminance level extractor for determining when the extracted average luminance level of the field is within a given threshold of the extracted black level of the frame.

43. A detector according to claim 42, further comprising; a sync pulse extractor being connected to the primary black level extractor for extracting the back porch of the video signal, and wherein the primary black level extractor comprises a secondary black level extractor for extracting the black level of the video signal during the back porch to produce extracted black level pulses.

44. A detector according to claim 43, wherein the sync pulse extractor is further connected to the line gating means and further extracts the horizontal sync pulse of the video signal and the line gating means gates the horizontal sync pulses of undesired lines to produce the gated signal.

45. A detector according to claim 44, wherein the primary black level extractor further comprises a first smoother connected to the secondary black level extractor for smoothing the extracted black level pulses.

46. A detector according to claim 45, wherein the frame average luminance level extractor comprises; a secondary luminance level extractor for extracting the luminance level of the gated signal.

47. A detector according to claim 46, wherein the frame average luminance level extractor further comprises a second smoother connected to the secondary luminance level extractor for smoothing the extracted luminance level to produce the average luminance level.

48. A detector according to claim 47, wherein the primary black level extractor extracts an uncompensated black level and the detector further comprises; a secondary peak luminance level extractor for extracting the peak luminance level of the gated signal to produce peak luminance level pulses; a third smoother connected to the secondary peak luminance level extractor for smoothing the peak luminance level pulses to produce a peak luminance level signal, and a black level offset means connected to the first smoother and the third smoother and the blank frame comparator for compensating the uncompensated black level with the peak luminance level signal to produce the black level.

49. A device according to claim 42, wherein the threshold is approximately 5%.

50. A device according to claim 42, wherein the primary black level extractor extracts an uncompensated black level, and the blank frame detector further comprises; a primary peak luminance level extractor being connected to the line gating means for extracting the peak luminance level of the gated signal, and a black level offset means being connected to the primary black level extractor, the primary peak luminance level extractor and the blank frame comparator for compensating the uncompensated black level with the peak luminance level to produce the black level.

51. A blank frame detector for operation on a video signal, the detector comprising:
- a primary black level extractor for extracting the black level of the video signal;
- a primary peak luminance extractor for extracting the peak luminance level of the video signal;
- black level offset means connected to the primary black level extractor and to the primary peak luminance level extractor for compensating the extracted black level with a desired portion of the extracted peak luminance level;
- a frame average luminance level extractor for extracting the average luminance level of the frame; and
- a blank frame comparator connected to the black level offset means and the frame average luminance level extractor for determining whether the extracted average luminance level is within a threshold of the compensated black level.

52. An identification unit for detecting a commercial advertisement on a video signal, the unit comprising:
- a blank frame detector for detecting blank frames on the video signal;
- an activity timer being connected to the blank frame detector and being set upon the detection of a blank frame in the signal; and
- an activity detector being connected to the blank frame detector and the activity timer for testing for activity representative of a commercial advertisement in the signal during the time the activity timer is set.

53. A device according to claim 52, wherein the video signal is a video signal and the blank frame detector comprises:
- a primary black level extractor for extracting the black level of the video signal;
- line gating means gating undesired portions of the video signal;

a frame average luminance level extractor being connected to the line gating means and for extracting the average luminance of a frame of the video signal;

a blank frame comparator being connected to the black level extractor and the frame average luminance level extractor for determining when the extracted black level of the field is within a given threshold of the extracted average luminance level of the frame.

54. A device according to claim 53, wherein the blank frame detector further comprises; a sync pulse extractor being connected to the primary black level extractor for extracting the back porch of the video signal, and wherein the primary black level extractor comprises a secondary black level extractor for extracting the black level of the video signal during the back porch to produce extracted black level pulses.

55. A device according to claim 54, wherein the sync pulse extractor is further connected to the line gating means and further extracts the horizontal sync pulse of the video signal and the line gating means gates the horizontal sync pulses of undesired lines and to produce the gated signal.

56. A device according to claim 55, wherein the primary black level extractor further comprises; a first smoother connected to the secondary black level extractor for smoothing the extracted black level pulses.

57. A device according to claim 56, wherein the frame average luminance level extractor comprises; a secondary luminance level extractor for extracting the luminance level of the gated signal.

58. A device according to claim 57, wherein the frame average luminance level extractor further comprises a second smoother connected to the secondary luminance level extractor for smoothing the extracted luminance level to produce the average luminance level.

59. A device according to 58, wherein the primary black level extractor extracts an uncompensated black level and the detector further comprises; a secondary peak luminance level extractor for extracting the peak luminance level of the gated signal to produce peak luminance level pulses; a third smoother connected to the secondary peak luminance level extractor for smoothing the peak luminance level pulses to produce a peak luminance level signal, and a black level offset means connected to the first smoother and the third smoother and the blank frame comparator for compensating the uncompensated black level with the peak luminance level signal to produce the black level.

60. A device according to claim 53, wherein the threshold is approximately 5%.

61. A device according to claim 53, wherein the primary black level extractor extracts an uncompensated black level, and the blank frame detector further comprises; a primary peak luminance level extractor being connected to the line gating means for extracting the peak luminance level of the gated signal, and a black level offset means being connected to the primary black level extractor, the primary peak luminance level extractor and the blank frame comparator for compensating the uncompensated black level with the peak luminance level to produce the black level.

62. A device according to claim 52, wherein the primary black level extractor extracts an uncompensated black level, and the blank frame detector further comprises; a primary peak luminance level extractor being connected to the line gating means for extracting the peak luminance level of the gated signal, and a black level offset means being connected to the primary black level extractor, the primary peak luminance level extractor and the blank frame comparator for compensating the uncompensated black level with the peak luminance level to produce the black level.

63. A device according to claim 53, wherein the activity detector comprises the average frame luminance level extractor, an integrator being connected to the average frame luminance level extractor for integrating the average frame luminance level over a number of frames, and a differentiator being connected to the timer and the integrator determining the rate of change of the integrated average force luminance level.

64. A device according to claim 63, wherein the blank frame detector comprises; a blank frame detector for operation on a video signal, the detector comprising:

a primary black level extractor for extracting the black level of the video signal;

line gating means gating undesired portions of the video signal;

a frame average luminance level extractor being connected to the line gating means and for extracting the average luminance of a frame of the video signal;

a blank frame comparator being connected to the black level extractor and the frame average luminance level extractor for determining when the extracted black level of the field is within a given threshold of the extracted average luminance level of the frame.

65. A device according to claim 64, wherein the blank frame detector further comprises; a sync pulse extractor being connected to the primary black level extractor for extracting the back porch of the video signal, and wherein the primary black level extractor comprises a secondary black level extractor for extracting the black level of the video signal during the back porch to produce extracted black level pulses.

66. A device according to claim 65, wherein the sync pulse extractor is further connected to the line gating means and further extracts the horizontal sync pulse of the video signal and the line gating means gates the horizontal sync pulses of undesired lines and to produce the gated signal.

67. A device according to claim 66, wherein the primary black level extractor further comprises a first smoother connected to the secondary black level extractor for smoothing the extracted black level pulses.

68. A device according to claim 67, wherein the frame average luminance level extractor comprises; a secondary luminance level extractor for extracting the luminance level of the gated signal.

69. A device according to claim 68, wherein the frame average luminance level extractor further comprises a second smoother connected to the secondary luminance level extractor for smoothing the extracted luminance level to produce the average luminance level.

70. A device according to claim 69, wherein the primary black level extractor extracts an uncompensated black level and the detector further comprises; a secondary peak luminance level extractor for extracting the peak luminance level of the gated signal to produce peak luminance level pulses; a third smoother connected to the secondary peak luminance level extractor for smoothing the peak luminance level pulses to produce a peak luminance level signal, and a black level offset means connected to the first smoother and the third smoother and the blank frame comparator for compensating the uncompensated black level with the peak luminance level signal to produce the black level.

71. A device according to claim 52, wherein the threshold is approximately 5%.

72. A device according to claim 52, wherein the video signal is a video signal and the activity detector comprises an integrator integrating the luminance level of the composite video signal over a number of frames and a differentiator connected to the integrator determining the rate of change of the integrated signal.

73. A content control unit for controlling a storage device recording a video signal to limit the recording of commercial material contained thereon, the unit comprising:

an identification section comprising:
  a blank frame detector for detecting blank frames in the video signal;
  an activity timer being connected to the blank frame detector and being set upon the detection of a blank frame in the video signal; and
  an activity detector being connected to the blank frame detector and the activity timer for testing for activity representative of a commercial advertisement in the video signal during the time the activity timer is set; and
a communication section being connected to the content control unit and adapted to be coupled to the storage device for communicating instructions based upon the detection of blank frames and the detection of such activity by the identification section.

74. A content control system operating on a video signal containing commercial material, the system comprising:

a storage device for recording the video signal;
a content control unit being connected to the storage device and comprising:
an identification section comprising:
  a blank frame detector for detecting blank frames in the video signal;
  an activity timer being connected to the blank frame detector and being set upon the detection of a blank frame in the video signal; and
  an activity detector being connected to the blank frame detector and the activity timer for testing for activity representative of a commercial advertisement in the video signal during the time the activity timer is set; and
a communication section being connected to the content control unit and coupled to the storage device for communicating instructions based upon the detection of blank frames and the detection of such activity by the identification section.

* * * * *